US008927295B2

(12) United States Patent
Hassell et al.

(10) Patent No.: US 8,927,295 B2
(45) Date of Patent: Jan. 6, 2015

(54) METHOD AND APPARATUS FOR CONVERSION OF MULTIPLE ANALYTE CATION TYPES TO A SINGLE ANALYTE ANION TYPE VIA ION/ION CHARGE INVERSION

(75) Inventors: Kerry M. Hassell, West Lafayette, IN (US); Scott A. McLuckey, West Lafayette, IN (US); Yves Leblanc, Newmarket (CA)

(73) Assignee: Purdue Research Foundation, West Lafayette, IN (US)

(*) Notice: Subject to any disclaimer, the term of this patent is extended or adjusted under 35 U.S.C. 154(b) by 291 days.

(21) Appl. No.: 12/874,819

(22) Filed: Sep. 2, 2010

(65) Prior Publication Data

US 2011/0059546 A1 Mar. 10, 2011

Related U.S. Application Data

(60) Provisional application No. 61/241,260, filed on Sep. 10, 2009.

(51) Int. Cl.
*G01N 24/00* (2006.01)
*H01J 49/00* (2006.01)

(52) U.S. Cl.
CPC .................................. *H01J 49/0072* (2013.01)
USPC .......................................................... 436/173

(58) Field of Classification Search
None
See application file for complete search history.

(56) References Cited

U.S. PATENT DOCUMENTS

| | | | |
|---|---|---|---|
| 7,550,718 | B2 | 6/2009 | McLuckey |
| 2008/0014656 | A1 | 1/2008 | Thomson |
| 2008/0073502 | A1 | 3/2008 | Schneider |
| 2008/0128611 | A1 | 6/2008 | McLuckey |

FOREIGN PATENT DOCUMENTS

| | | | |
|---|---|---|---|
| JP | 2008 516242 | A | 10/2005 |
| JP | 2013 511211 | A | 3/2013 |
| WO | WO 2006/042187 | A2 | 4/2006 |
| WO | WO 2006/042187 | A3 | 4/2006 |
| WO | WO 2008/069959 | A2 | 6/2008 |

OTHER PUBLICATIONS

Xia, Y. et al. Pulsed dual electrospray ionization for ion/ion reactions. 2005, American Society for mass spectrometry, vol. 16, pp. 1750-1756.*

Search Report from related PCT application No. PCT/US2010/047970, mailing date Mar. 22, 2012 (2 pgs).

Office Action for related Application No. JP 2012 528853 Mailing Date Apr. 3, 2014.

(Continued)

*Primary Examiner* — Robert Xu
(74) *Attorney, Agent, or Firm* — Brinks Gilson & Lione

(57) ABSTRACT

An apparatus and method for a sample using a mass spectrometer is described, including, generating ions of a first polarity from an analyte using electrospray ionization; generating ions of a second polarity from a reagent; injecting the ions of the first polarity and ions of the second polarity in sequence into a chamber of the mass spectrometer such that the ions of the first polarity and the ions of the second polarity interact in the chamber to form analyte ions having the second polarity; and, analyzing the mass spectrum of the analyte ions of the second polarity. A reagent such as a polyamidomine is selected to preferentially yield analyte ions of the second polarity having a desired mass-to-charge ratio.

12 Claims, 11 Drawing Sheets

(56) References Cited

OTHER PUBLICATIONS

Shigeo Hayakawa, Nobutake Kabuki, Yoshiaki Kawamura, Akihiro Kitaguchi, "*The Basis of Charge Inversion Mass Spectrometry I: Historical Introduction and Differences between Four Types of Charge Inversion*", J. Mass Spectro, Soc. Jpn., vol. 53, No. 1, 2005, pp. 33-51.

Min He, Scott A. McLuckey, "*Two Ion/Ion Charge Inversion Steps To Form a Doubly Protonated Peptide from a Singly Protonated Peptide in the Gas Phase*", J.Am. Chem. Soc., vol. 125, No. 26, Published on Web Jun. 7, 2003.

* cited by examiner

METHOD AND APPARATUS FOR CONVERSION OF MULTIPLE ANALYTE CATION TYPES TO A SINGLE ANALYTE ANION TYPE VIA ION/ION CHARGE INVERSION

This application claims the benefit of priority to U.S. provisional application Ser. 61/241,260, filed on Sep. 10, 2009, which is incorporated herein by reference.

TECHNICAL FIELD

The present application may relate to a apparatus and method for mass spectrometry.

BACKGROUND

Tandem mass spectrometry, or mass spectrometry/mass spectrometry (MS/MS) may be used for complex mixture analysis due to its high specificity, wide applicability, and good sensitivity. MS/MS can be applied directly to a mixture or in conjunction with an on-line separation technique, such as gas chromatography (i.e., GC/MS/MS) or liquid chromatography (i.e., LC/MS/MS).

Ideally, each mixture component gives rise to a single ion type that is related to the component mass. Multiple peaks per mixture component can reduce sensitivity and compromise specificity, particularly when the mixture subjected to ionization is complex. Such a scenario can occur, for example, in the analysis of complex mixtures derived from biological fluids. Positive electrospray ionization of drugs and drug metabolites, which is a common approach for non-volatile analytes, either in conjunction with LC or flow injection, may lead to multiple ion types per component. This may be particularly common with solutions having a relatively high salt content.

The ion types generally include the protonated molecule and the analyte molecule with one or more excess metal ions that may originate from the sample matrix (sodium and potassium ions being most common). This phenomenon gives rise to an undesirable distribution of analytical signal among the various distinct ions, more complex spectra, and possible ambiguities in the masses of the mixture components because the identities of ion types are may not be obvious.

SUMMARY

A method of analyzing a sample using a mass spectrometer is described, including: generating ions of a first polarity from an analyte; generating ions of a second polarity from a reagent; injecting the ions of the first polarity and ions of the second polarity in sequence into a chamber of the mass spectrometer such that the ions of the first polarity and the ions of the second polarity interact in the chamber to form analyte ions having the second polarity; and, analyzing the mass spectrum of the analyte ions of the second polarity. The reagent is selected to preferentially yield analyte ions of the second polarity having a desired mass-to-charge ratio.

DESCRIPTION

Figure 1:
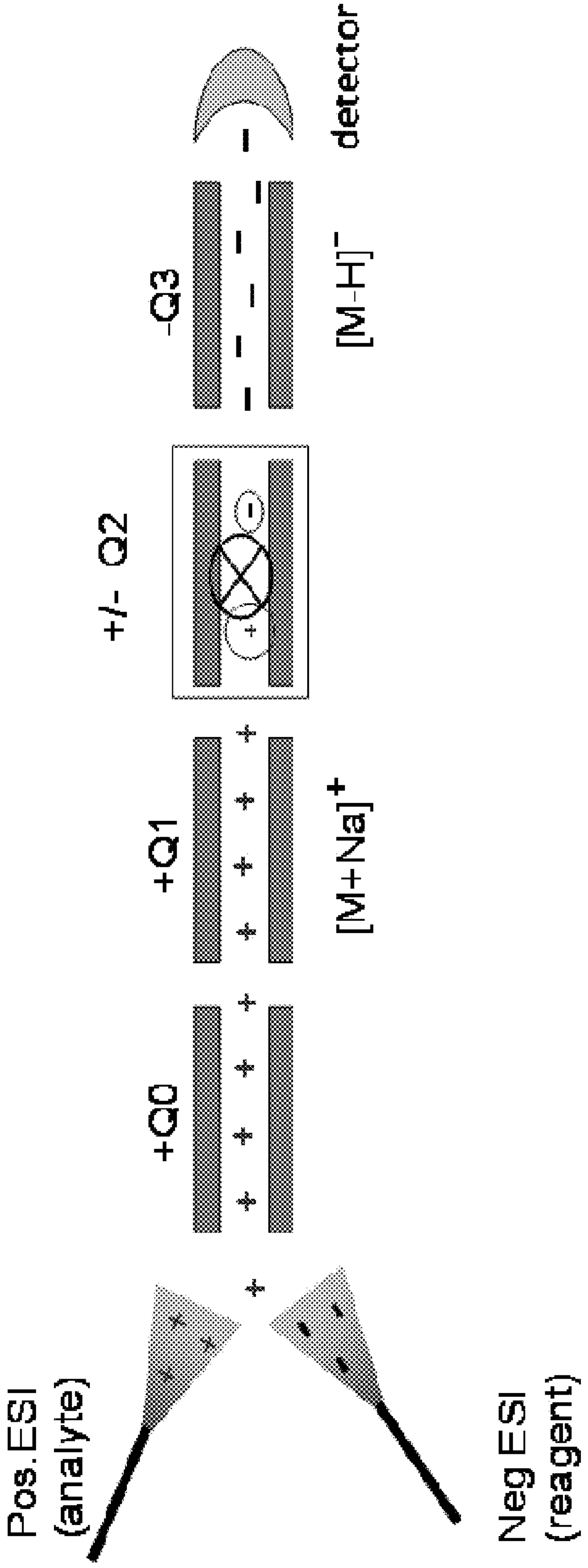
FIG. 1 is a simplified schematic diagram of a hybrid triple quadrupole/LIT instrument with dual electrospray ionization emitters for charge inversion, adapted to perform the method described herein.

Exemplary embodiments may be better understood with reference to the drawings, but these embodiments are not intended to be of a limiting nature. In the following description, numerous specific details are set forth in order to provide a thorough understanding of the present invention which, however, may be practiced without some or all of these specific details. In other instances, well known process operations have not been described in detail in order not to unnecessarily obscure the description.

Gas-phase ion/ion charge inversion reactions may be used to convert a mixture of cation types derived from the same analyte molecule to a common ion of opposite polarity. There is a degree of selectivity associated with this charge inversion process that depends upon chemical characteristics of both the analyte cations and the reagent anions. Within the long-lived ionic complex associated with charge inversion there is a competition between the analyte and reagent species for the charge carrying groups. The chemical characteristics of the reagent may be selected to favor the formation of a most favored form of the analyte ion. In the case of mixtures of protonated and metal cationized species, for example, anions with multiple deprotonated acidic sites, as well as protons capable of exchange, may remove both metal ions and protons such that the deprotonated analyte is the dominant analyte-related species after charge inversion. The extent to which metal ions can be removed from the analyte species may depend upon, for example, the numbers of acidic sites in the reagent, the number of sites that are deprotonated, and extent to which metal ions may already be present in the reagent.

Charge inversion ion/ion reactions may convert several cation-types associated with a single analyte molecule to a single anion-type for subsequent mass analysis. Analyte ions present with one of a variety of cationizing agents, such as an excess proton, excess sodium ion, or excess potassium ion, may be converted to deprotonated molecules, provided that a stable anion can be generated for the analyte. Multiply deprotonated species that are capable of exchanging a proton for a metal ion may serve as the reagent anions for the reaction.

Examples of this process are provided for warfarin and for a glutathione conjugate. Further examples for several other glutathione conjugates are also provided as to demonstrate the generality of the reaction. In the case of glutathione conjugates, multiple metal ions may be associated with the singly-charged analyte due to the presence of two carboxylate groups. The charge inversion reaction process also may involve the removal of the excess cationizing agent, as well as any metal ions associated with anionic groups, so as to yield a singly deprotonated analyte molecule.

The ability to convert multiple cation types to a desired single anion type may be useful in cases in which the analyte mass-spectrometry signal may distributed among several cation types, as may be common in the electrospray ionization of solutions with relatively high salt contents. For analyte species that undergo efficient charge inversion, such as glutathione conjugates, significantly improved signal-to-noise ratios may be observed when species that give rise to "chemical noise" in the positive ion spectrum undergo less efficient charge inversion.

A method based on gas-phase ion/ion chemistry for converting various forms of an analyte cation (e.g., $(M+H)^+$ and $(M+metal)^+$) into a single known ion-type (e.g., $(M-H)^-$) is described. The method may use gas-phase ion/ion charge inversion reactions. For clarity of presentation, the reaction for singly charged analyte ions is described in detail, although more highly charged analyte ions may also undergo this charge inversion process. The reaction described involves a single ion/ion encounter that results in the removal of excess cations, as well as deprotonation of the neutralized analyte to yield the deprotonated analyte:

$$(M+cation)^+ + (R-nH)^{n-} \rightarrow (M-H)^- + (R-(n-1)H+cation)^{(n-2)-} \quad (1)$$

where $(R-nH)^{n-}$ represents a multiply deprotonated reagent anion. Anions derived from carboxylate-terminated dendrimers (e.g., ethylenediamine core polyamidoamine (PAMAM) half-generation), formed by electrospray ionization, as well as multiply deprotonated oligonucleotides, have been shown to be effective as reagent anions. A reagent having multiple acidic sites capable of forming multiply deprotonated species via electrospray may serve as the charge inversion reagent.

In the case of negative ion formation with spray ionization methods (i.e., electrospray ionization and variations thereof), the most commonly observed anions are deprotonated versions of the analyte species (viz., $(M-H)^-$). However, anion attachment may also take place to yield $(M+X)^-$ species, where X represents anions such as acetate, nitrate, halide ions, or the like. Charge inversion reactions can be used to convert both $(M-H)^-$ and $(M+X)^-$ species to $(M+H)^+$ ions.

The process for the anion adduct species is represented as:

$$(M+X)^- + (R+nH)^{n+} \rightarrow (M+H)^+ + (R+(n-2)H)^{(n-2)+} + HX \quad (2)$$

where R represents a reagent with multiple basic sites, such as a protein or amino terminated diaminobutane (DAB) dendrimers.

Charge inversion ion/ion reactions have been implemented using three-dimensional (3D) ion traps and linear ion traps. Implementing ion/ion reactions in electrodynamic ion traps facilitates tandem mass spectrometry as the geometry is favorable.

The examples provided here were obtained using a hybrid triple quadrupole/linear ion trap instrument that has been adapted for ion/ion reactions. The instrument is based upon the commercially available MDS/Sciex QTRAP 2000 platform, which is shown schematically in FIG. 1. The instrument was adapted to allow for the application of rf-voltages to the trapping plates on either side of Q2, so as to contain ion species of opposite polarities.

The QTRAP instrument used was comprised of four in-line quadrupole arrays designated as Q0-Q3. Any of the arrays of this instrument can, in principle, be operated as either ion transmission or ion trapping devices. There are, therefore, many variations of a method that combines transmission and trapping steps as parts of an overall ion processing scheme, so examples provided herein are of a non-limiting nature.

One example operating procedure employs Q0 as a radio-frequency (re-only transmission device, Q1 as a precursor ion mass-selection device (e.g., operation of Q1 in a rf/dc mass filtering mode), Q2 as an ion/ion reaction region, and Q3 as a mass-analyzing linear ion trap (LIT). The Q2 array may be maintained at a nitrogen gas pressure within the range of 2-8 mtorr during the ion/ion reaction period and may be operated in a mutual ion polarity storage mode by applying rf potentials to the containment lenses on either side of the array lenses (lenses not shown in the schematic of FIG. 1).

An example of a charge inversion ion/ion reaction experiment using the apparatus and operating procedure described above comprises: (1) transmission of reagent anions formed via electrospray ionization into Q2 where the reagent ions are temporarily stored (Q1 may be used to transmit ions with a narrow value band of m/z values, or may be used as a wide-value-band transmission device), (2) transmission of analyte cations, formed by positive electrospray ionization, into Q2, (3) mutual storage of both ion polarities in Q2 to allow for ion/ion reactions, (4) subsequent transfer of the ion polarity of interest into Q3 where the population of interest is stored in a LIT operated in the $1\text{-}10\times10^{-5}$ torr range, and (5) mass analysis via mass-selective axial ejection (MSAE). The time frames associated with each step are variable within the range of ten to a few hundred milliseconds and depend primarily on ion signal levels. The operation of the process in which the analyte species are anions and the reagent ions are cations would follow the same procedure with the appropriate selection of ion polarity.

Generally, the control of the QTRAP instrument for performing the process is by a computing device such as an embedded computer, or an external computer interfaced with the instrument. The computer may execute a stored program where the equipment parameters, such as time duration of a step, voltage levels, radio frequency, and the like are used to control the operation of a QTRAP instrument in a time dependent manner. Some or all of the parameters may be varied experimentally using an operator interface, such as a video display and keyboard, mouse, or the like, or may be stored, as are the computer program instructions, on a computer readable media, as is known in the art, or may be subsequently be developed to perform the same or similar function.

The materials, warfarin (RS)-4-hydroxy-3-(3-oxo-1-phenylbutyl)-2H-chromen-2-one and GSH metabolites were provided by collaborators at MDS Sciex (Concord, Canada). Bradykinin and PAMAM dendrimers were purchased from Sigma-Aldrich (St. Louis, Mo.).

Polyamidoamine (PAMAM) dendrimers represent a class of macromolecular architecture called "dense star" polymers. Unlike classical polymers, dendrimers have a high degree of molecular uniformity, narrow molecular weight distribution, specific size and shape characteristics, and a highly-functionalized terminal surface. The manufacturing process for a PAMAM dendrimer is a series of repetitive steps starting with a central initiator core. Each subsequent growth step represents a new "generation" of polymer with a larger molecular diameter, about twice the number of reactive surface sites, and approximately double the molecular weight of the preceding generation.

Methanol, glacial acetic acid, and ammonium hydroxide were obtained from Malinckrodt (Phillipsburg, N.J.).

A single charge transfer that leads to analyte neutralization allows for a degree of selectivity in charge inversion if ions of interfering species preferentially undergo single charge transfer (and thereby are neutralized) while the analyte species preferentially undergoes multiple charge transfers to yield an ion of opposite charge.

$$\rightarrow (M-H)^{-} + (R-(n-2)H)^{(n-2)-} \qquad (3)$$

$$(M+H)^{+} + (R-nH)^{n-} \rightarrow [M+R-(n-1)H]^{(n-1)-*} \rightarrow M + (R-(n-1)H)^{(n-1)-} \qquad (4)$$

M. He, S. A. McLuckey, J. Am. Chem. Soc., 125 (2003) 7756-7757. "Two Ion/ion Charge Inversion Steps to form a Doubly-protonated Peptide from a Singly-protonated Peptide in the Gas Phase;" M. He, J. F. Emory, S. A. McLuckey, Anal. Chem., 77 (2005) 3173-3182; "Reagent Anions for Charge Inversion of Polypeptide/Protein Cations in the Gas Phase;" and S. A. McLuckey and M. He, U.S. Pat. No. 7,550,718. (June, 2009) "Process for Increasing Ionic Charge in Mass Spectrometry," have demonstrated the inversion of the charge of a protonated molecule to the deprotonated form via two proton transfers in the course of a single ion/ion collision (i.e., reaction (3)). Reaction (3) competes with the transfer of a single proton, which may take place through a long-lived intermediate, as shown in process (4), or via a proton hopping mechanism without formation of a long-lived complex (not shown). Both of the mechanisms for single charge transfer may be undesirable within the context of charge inversion.

Figure 2:
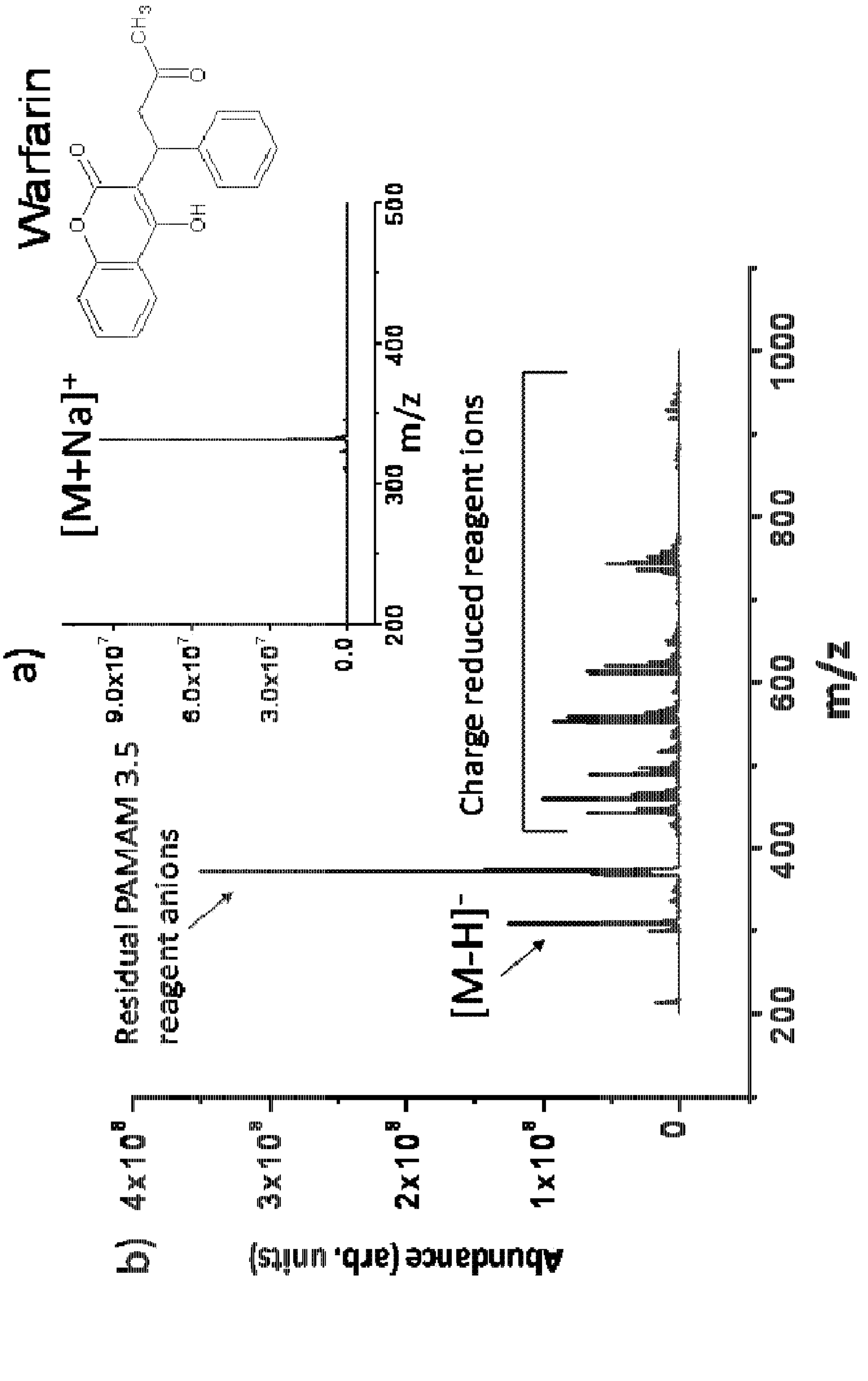
FIG. 2 shows data for (a) isolated $(M+Na)^+$ ion of warfarin and (b) negative ion post-ion/ion reaction products after reaction with m/z 369 anions from PAMAM generation 3.5.

When the analyte carries a net charge due to the addition of an ion other than a proton, the reagent may remove the excess ion as well as one proton so as to yield the deprotonated molecule. This condition may be satisfied by several reagent anion types. FIG. 2 shows the results obtained from reaction of the $(M+Na)^{+}$ ion of the drug warfarin with anions of roughly m/z 369 (a relatively wide ion isolation window was used to select the reagent anions) derived from PAMAM generation 3.5 dendrimers. The PAMAM generation 3.5 dendrimer was terminated by 64 carboxylic acid groups.

The main analyte-related ion in the product ion spectrum is the deprotonated molecule. The formation of the deprotonated molecule involves the removal of one sodium ion and one proton. In this case, the absolute signal in the negative ion mode may be slightly higher than that observed in the positive ion mode. Care was taken in comparing absolute signal levels due to possible differences in detection efficiencies for negative ions and positive ions or variations in ion abundances during the course of the data collection. Furthermore, the extent of the reaction may vary based on the reaction times and the ion abundances. Generally, analyte ion abundances before and after charge inversion tend to be of the same order of magnitude, provided the analyte has both acidic and basic sites such that the analyte undergoes charge inversion relatively efficiently.

Figure 3:
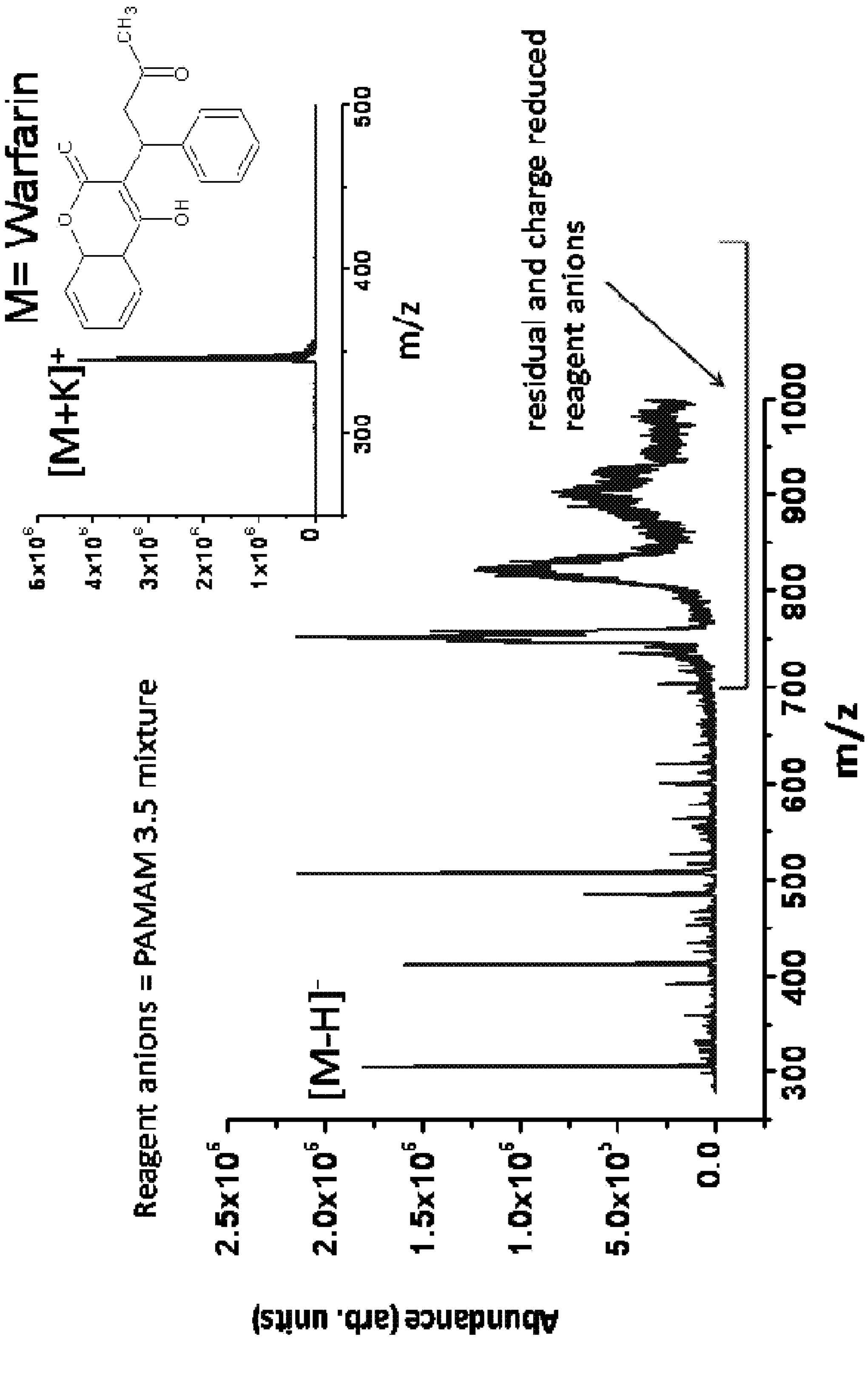
FIG. 3 shows data for (a) isolated $(M+K)^+$ ion of warfarin; and, (b) negative ion post-ion/ion reaction products after reaction with anions from PAMAM generation 3.5.

FIG. 3 shows the results of a similar experiment using the method, except that the warfarin $(M+K)^{+}$ ion is subjected to a reaction with a relatively complex mixture of PAMAM dendrimer anions. Like the $(M+Na)^{+}$ ions (FIG. 2) and $(M+H)^{+}$ ions (data not shown), the charge inversion reaction leads to the $(M-H)^{-}$ ion. Hence, a mixture of analyte ions comprised of the three cations just mentioned may react to yield a common anion. In this case, the absolute $(M-H)^{-}$ signal may be not quite half that of the pre-ion/ion reaction cation signal.

The mass spectrum of the PAMAM generation 3.5 dendrimer anion population tends to be complex because the population typically includes mixtures of charge states, condensed-phase decomposition products, mixtures of counterions, and fragmentation products. This degree of complexity may complicate the confirmation of mechanistic aspects of the reaction by examining the reagent anion products.

Figure 4:
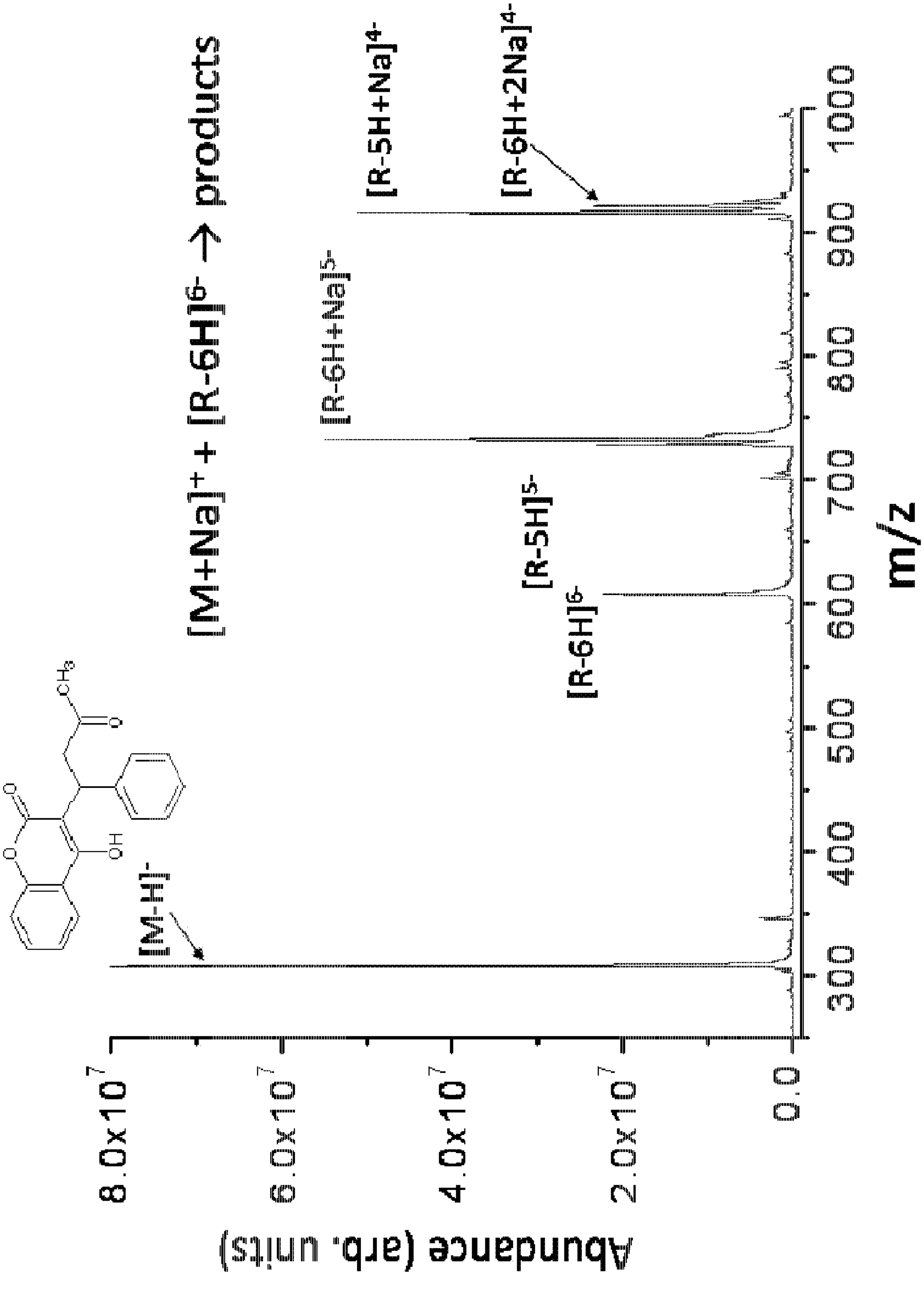
FIG. 4 shows data for a charge inversion product ion spectrum of the warfarin $[M+Na]^+$ ion in reaction with an oligonucleotide 12-mer $[R-6H]^{6-}$.

FIG. 4 shows the product ion spectrum derived from the reaction of the warfarin $[M+Na]^{+}$ ion with the $[R-6H]^{6-}$ anion derived from negative ion electrospray ionization of a 12-mer oligonucleotide (R=5'-d(CTTAGCGCTAAG)-3'), and may provide a clearer result. As with other reagent anions examined, the $[M-H]^{-}$ species appears to be the dominant analyte anion formed in the reaction. These results are of interest from the standpoint of the information inherent in the reagent ion products. One set of products represents single charge transfer, which may result in neutralization of the analyte.

Products from both proton transfer (viz., the $[R-5H]^{5-}$ ion) and sodium ion transfer (viz., the $[R-6H+Na]^{5-}$ ion) are formed. The latter ion product has roughly twice the abundance of the former, suggesting that sodium ion transfer may be preferred over proton transfer. The more directly relevant set of products may be those formed from the transfer of two charges which also yields the $[M-H]^{-}$ product. Consistent with the dominance of the $[M-H]^{-}$ ion is the dominance of the $[R-5H+Na]^{4-}$ product, which results from the transfer of one proton and one sodium ion. There is little evidence for the transfer of two protons in a single collision, which would have resulted in complementary $[M+Na-2H]^{-}/[R-4H]^{4-}$ ions. There is evidence for $[R-6H+2Na]^{4-}$ ions, which maybe formed from two consecutive sodium ion transfer reactions from distinct $[M+Na]^{+}$ ions. The dominance of the $[R-5H+Na]^{4-}$ product ion, along with the formation of the $[M-H]^{-}$ ion, appears to confirm that reaction (1) is the major reaction channel for charge inversion of the metal-cationized analyte.

Figure 5:
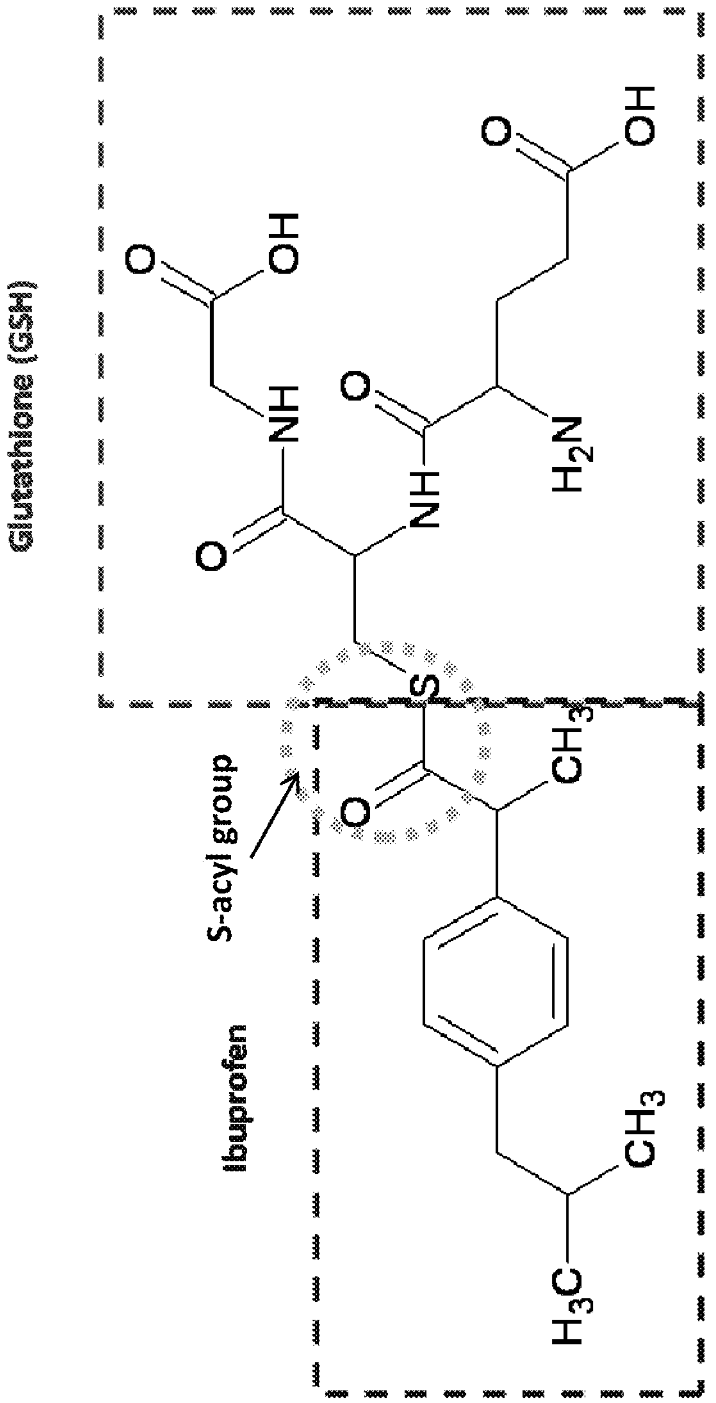
FIG. 5 illustrates the structure of the ibuprofen-glutathione adduct.

Glutathione conjugates constitute a class of drug metabolites suitable for analysis using the method as they are very often observed with one or more metal adducts. FIG. 5 shows the structure of the S-ibuprofen-GSH adduct as an example of a drug-GSH conjugate. These adducts are generally formed from a dehydration reaction with linkage via the sulfur atom of the cysteine of GSH. The GSH tripeptide has two carboxylate groups where metals can serve as counter-ions. Hence, it may be common to observe such adducts in the mass spectrum with zero, one, two, or three metal ions, depending upon the salt content of the sample. Singly-charged species with two or three excess metals are deficient in one or two protons. It may be expected, therefore, that the removal of counterions from an anionic site may be more challenging than the removal of an excess cation bound associated with a neutral site.

The reduced form of glutathione (GSH) may serve as an antioxidant and, in some cases, as a detoxifying agent, through conjugation of an exogenous agent with the sulfur of the thiol group. The two carboxylic acid groups in the reduced form of glutathione and the carboxylate moieties may serve as sites for metal ion binding. Hence, such GSH-adducts in the mass spectrum with up to three or more metal ions may be observed, depending upon the salt content of the sample and the number of counter-ion sites (e.g., the adduct may also have a metal-binding site). Singly-charged species with two or three excess metal ions are deficient in one or two protons. The removal of counter-ions from an anionic site may be more difficult than the removal of an excess cation associated with a neutral site. The process may need an exchange of a proton for a sodium ion. Hence, the reagent anion should contain both sites for metal ion binding and acidic protons for exchange with the analyte.

Figure 6:
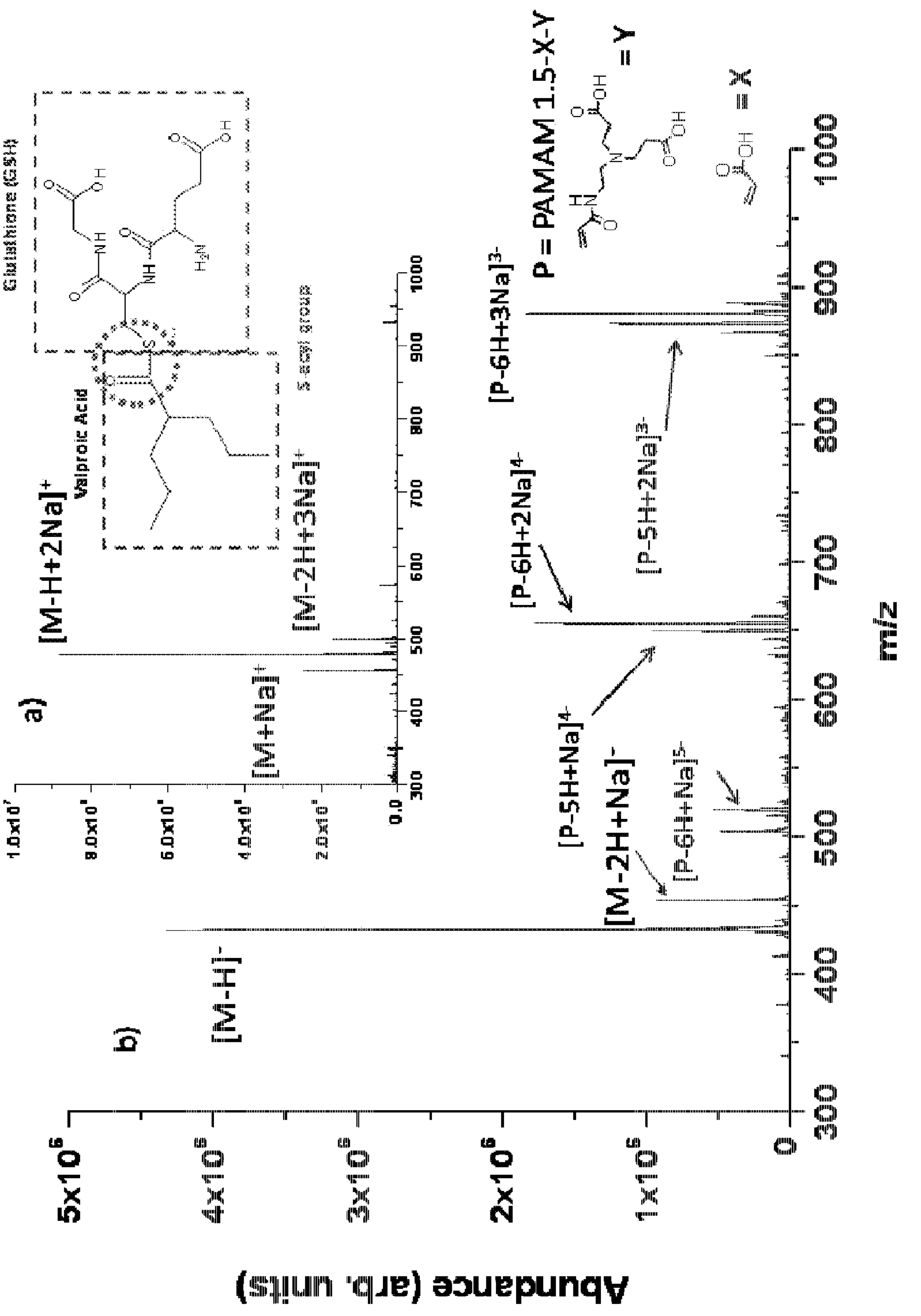
FIG. 6 shows data for a) positive electrospray mass spectrum of S-valproic acid-GSH and b) negative ion mass spectrum after the ion/ion reaction period.

Multiple sodium ions can be removed from glutathione adducts upon charge inversion with multiply deprotonated reagent anions derived from PAMAM half-generation dendrimers, as illustrated in FIG. 6, which summarizes a charge inversion experiment with cations derived from the S-valproic acid-GSH adduct and the $[PAMAM\text{-}X\text{-}Y\text{-}6H]^{6-}$ ions derived from PAMAM generation 1.5. The X and Y fragments are products from "retro-Michael addition" reactions that may occur either in solution or in the gas-phase. The GSH adduct may show as many as three excess sodium ions in the singly charged ion and very little $[M+H]^+$ (see FIG. 6(*a*)). Nevertheless, the charge inversion products (FIG. 6(*c*)) may be dominated by $[M-H]^-$ ions with a smaller but significant population of $[M-2H+Na]^-$ ions. The charge reduced reagent ion signals may also reflect a degree of sodium ion transfer to the reagents from the appearance of products that contain one or more sodium ions.

There are sixteen carboxylic acid groups at the periphery of the PAMAM generation 1.5 dendrimer. The structures corresponding to PAMAM-X-Y have thirteen carboxylic acid groups such that the $[PAMAM\text{-}X\text{-}Y\text{-}6H]^{6-}$ species contains six carboxylate groups and seven carboxylic acid groups. Hence, the protons that are exchanged for the sodium ions in the GSH-adduct presumably originate from the carboxylic acid groups in the dendrimer.

The extent to which metal ions are removed from the analyte ion upon charge inversion may be dependent upon the charge state and dendrimer generation number. The number of exchangeable protons, the number of anionic sites, and the magnitude of the electrostatic repulsion in the reagent anion may play roles in the extent to which metal ions can be removed. The extent to which metal ions are already present in the reagent dendrimer may also be a factor.

A role that the reagent anion may play a role in metal ion removal by may be seen by comparing the results of FIG. 4 with those of FIG. 6, the latter of which illustrates an experiment involving the reaction of cations derived from a precipitated plasma sample that was spiked with S-valproic acid-GSH. The cations of FIG. 6(*a*), which show $[M+H]^+$ ions that, if present, buried in a relatively high level of chemical noise, reacted with a range of anions within a window of roughly m/z 745-760 derived from PAMAM generation 3.5. The mixture of reagent ions in this window gave rise to charge inversion of the $[M-H]^-$ ion. This is consistent with other results (not shown here) that also indicate that the PAMAM 3.5 generation anions in this m/z window may result in more complete removal of metal ions from GSH-adducts than do the reagent anions used in the experiment of FIG. 6.

The GSH adduct shows as many as three excess sodium ions in the singly charged ion and very little $[M+H]^-$. Nevertheless, the charge inversion products appear to be dominated by $[M-H]^-$ ions with a smaller but significant population of $[M-2H+Na]^-$ ions. The $[R-6H]^{6-}$ reagent anions appear to remove sodium ions, as reflected by the presence of abundant $[R-5H+Na]^{4-}$ and $[R-6H+2Na]^{4-}$ products, among other Na-containing products.

Figure 7:
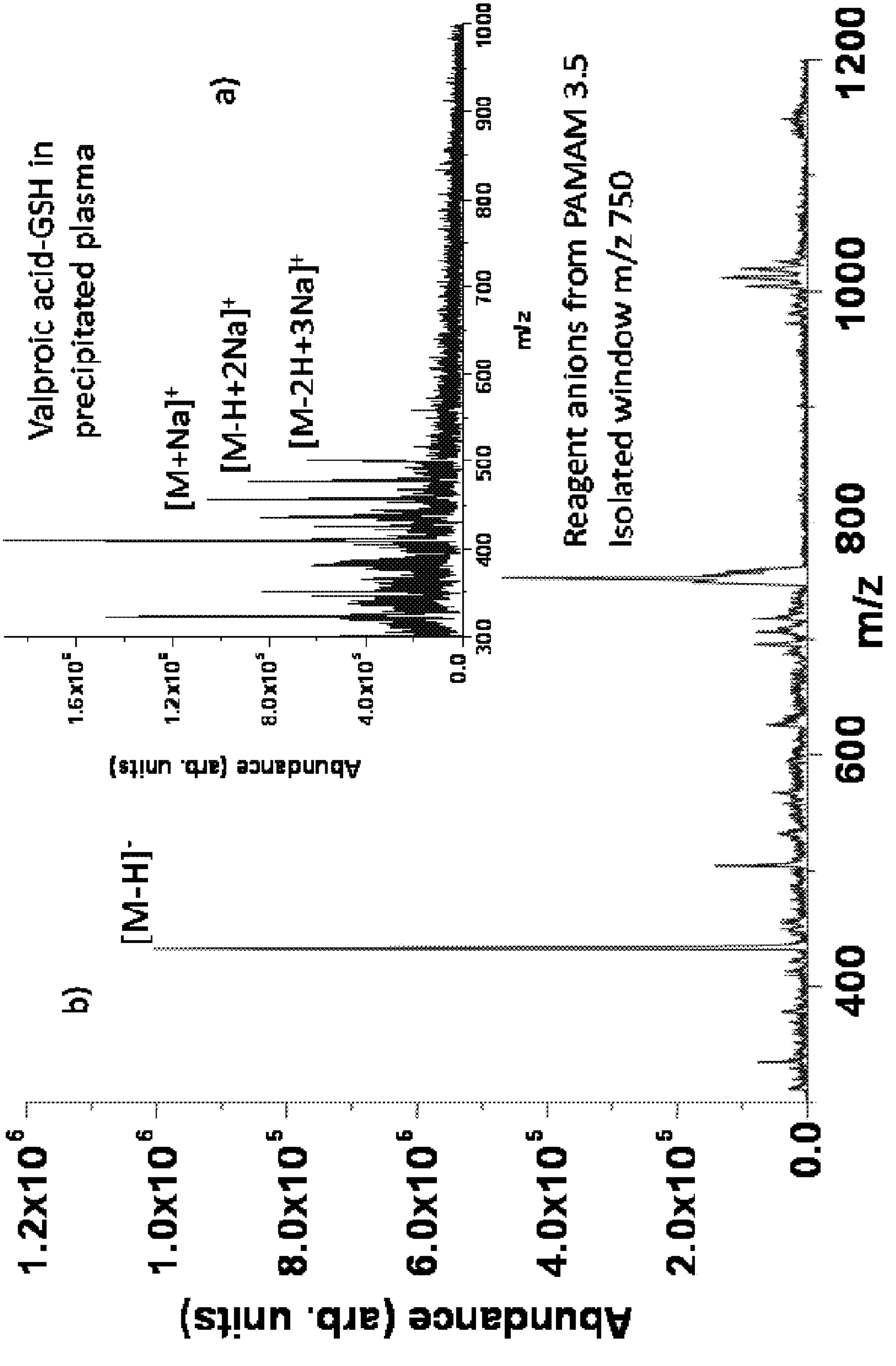
FIG. 7 shows data for a) positive ion electrospray mass spectrum of S-valproic acid-GSH in precipitated plasma and b) charge inversion spectrum using anions derived from PAMAM generation 3.5 (m/z 745-760) as charge inversion reagents.
Figure 8:
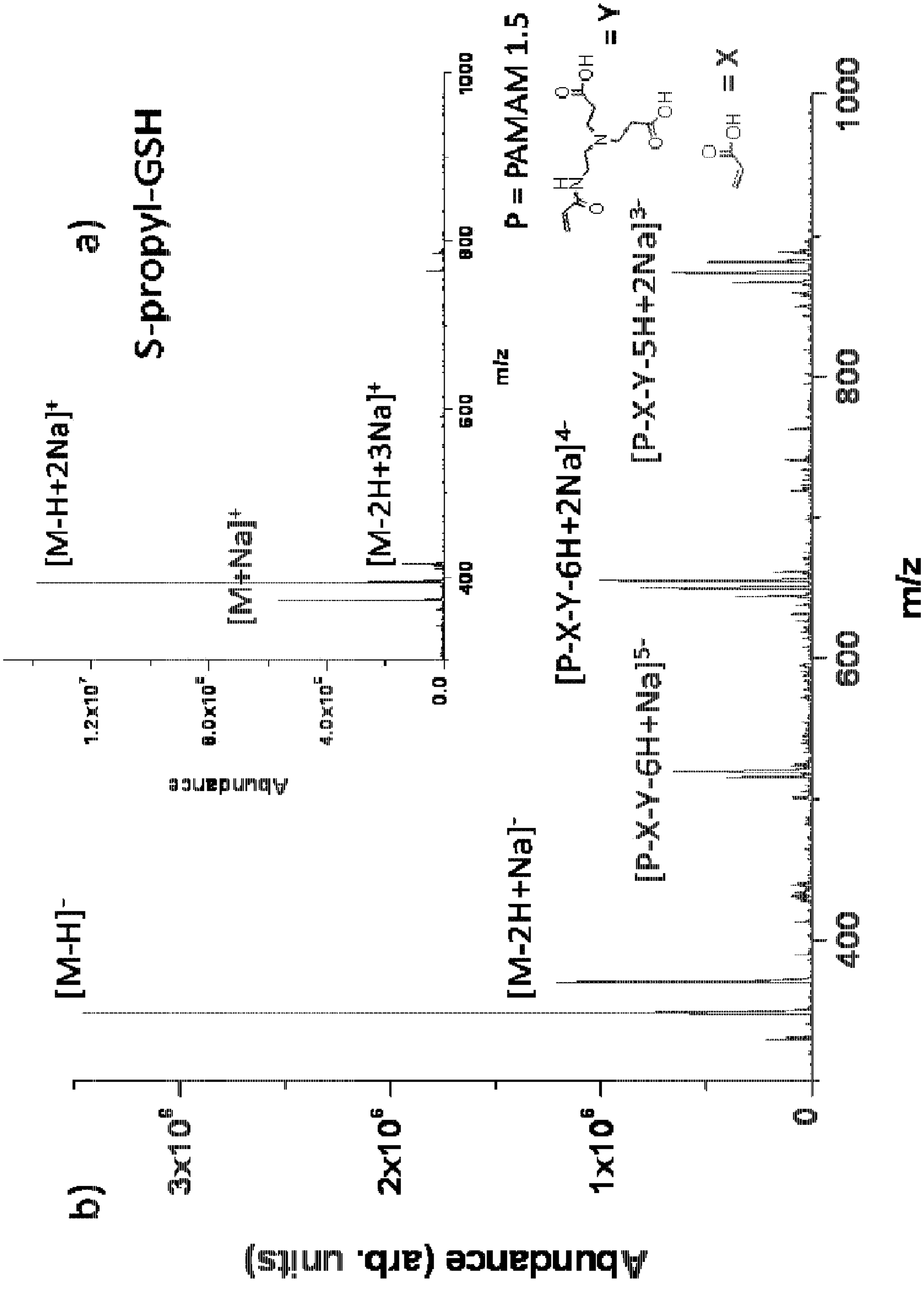
FIG. 8 shows data for a) positive ion electrospray mass spectrum of S-propyl glutathione and b) negative ion spectrum after ion/ion charge inversion using $[P\text{-}X\text{-}Y\text{-}6H]^{6-}$ reagent anions, where P=PAMAM generation 1.5.
Figure 9:
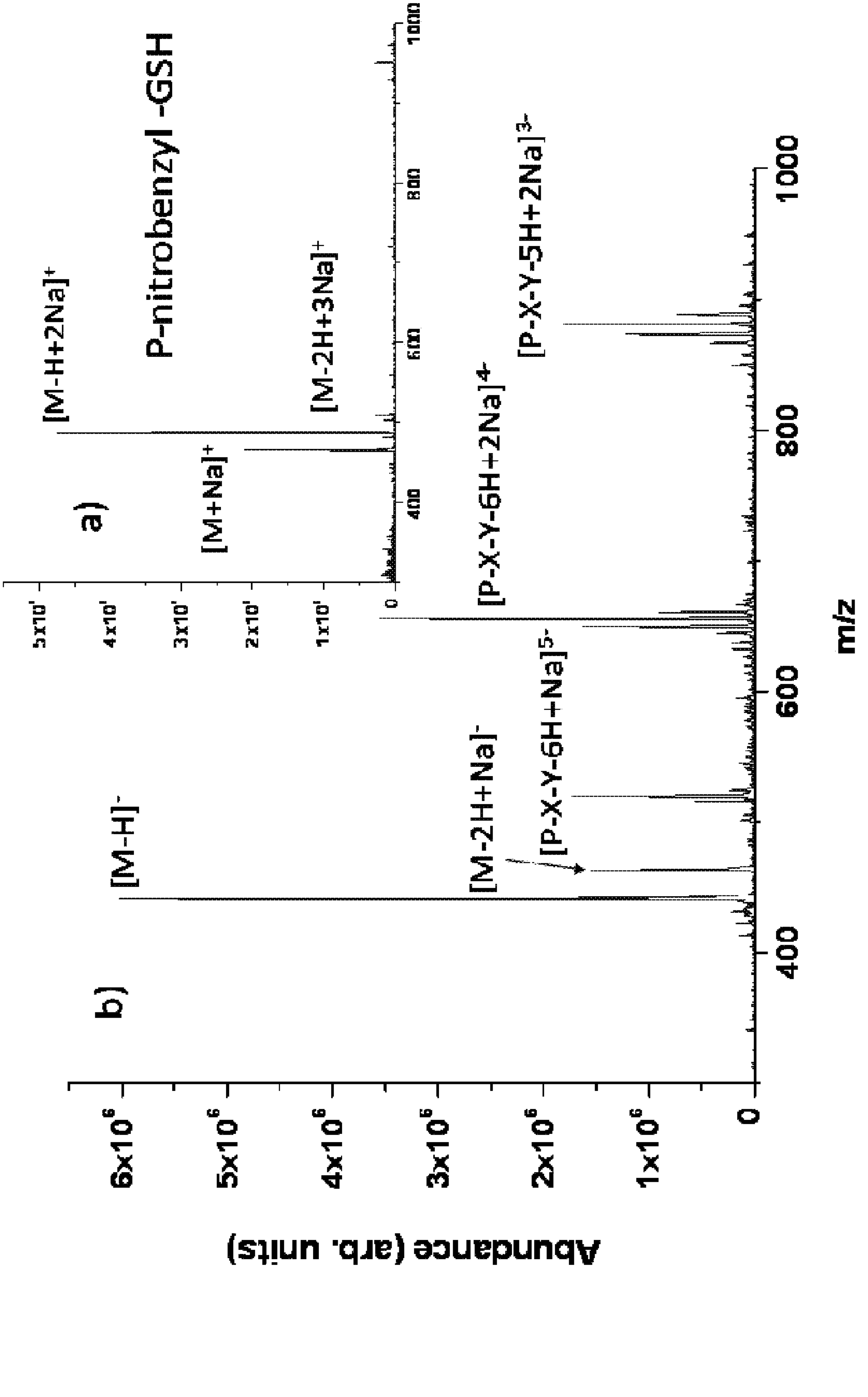
FIG. 9 shows data for a) positive ion electrospray mass spectrum of P-nitrobenzyl glutathione and b) negative ion spectrum after ion/ion charge inversion using $[P\text{-}X\text{-}Y\text{-}6H]^{6-}$ reagent anions, where P=PAMAM generation 1.5 (see FIG. 8 for structures of X and Y)
Figure 10:
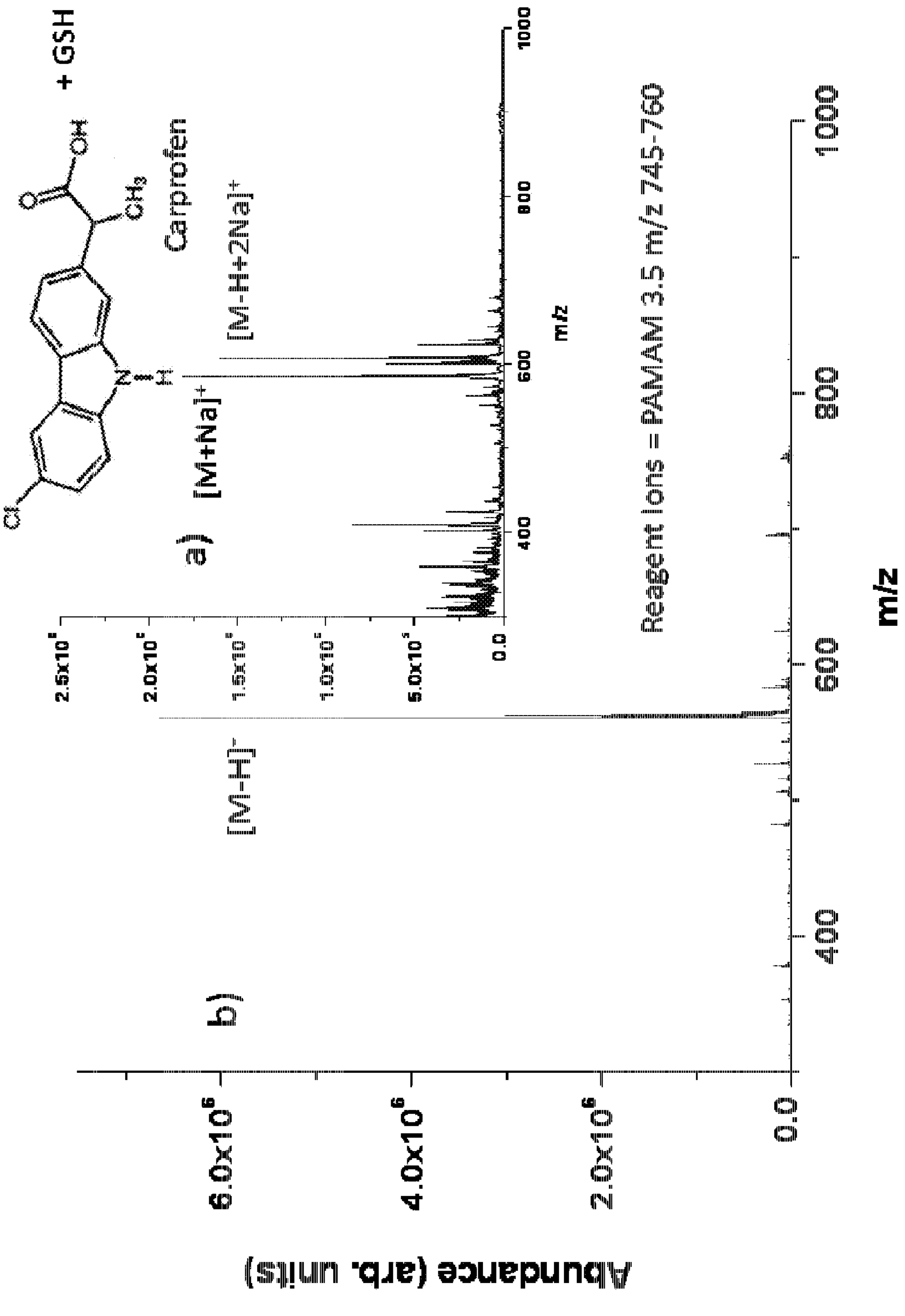
FIG. 10 shows data for a) positive ion electrospray mass spectrum of the GSH conjugate of carprofen (see structure in the figure) and b) negative ion spectrum after ion/ion charge inversion using anions in the m/z region of 745-760 derived from nano-electrospray of PAMAM generation 3.
Figure 11:
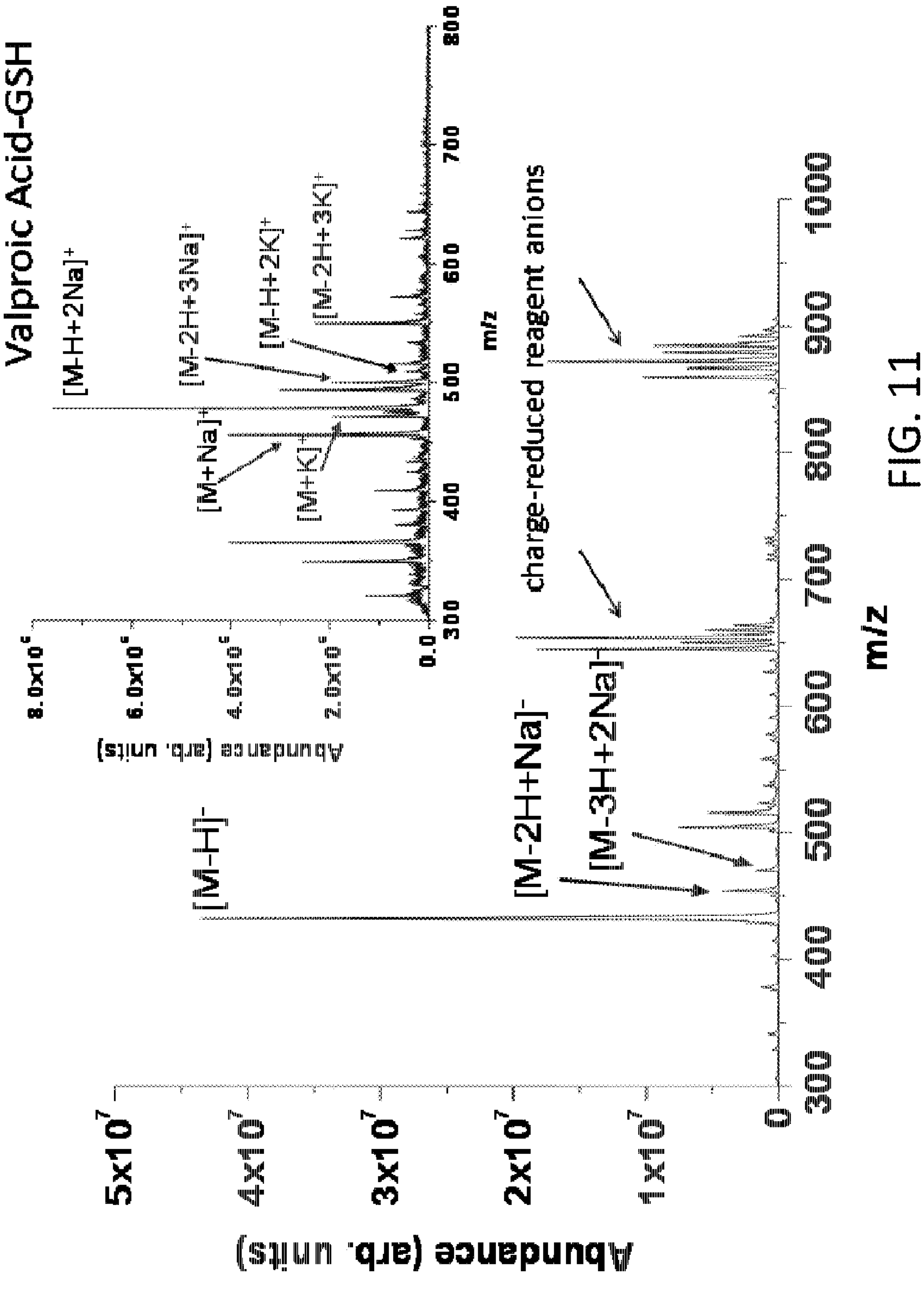
FIG. 11 shows data for a) positive electrospray mass spectrum of valproic acid-GSH with significant $[M+K]^+$ signal and b)) negative ion spectrum after ion/ion charge inversion using $[P\text{-}X\text{-}Y\text{-}6H]^{6-}$ reagent anions, where P=PAMAM generation 1.5 (see FIG. 8 for structures of X and Y).

An illustration of the application of charge inversion to an analyte species present in a complex matrix is provided in FIG. 7. FIG. 7(*a*) shows part of the positive ion electrospray ionization mass spectrum of precipitated blood plasma that contained the glutathione-valproic acid adduct. Very little $[M+H]^+$ is observed from this sample, probably due to the higher salt content expected from this complex matrix. In this case, anions derived from PAMAM generation 3.5 were used as the reagents. Essentially no sodium-containing anions were noted in the charge inversion spectrum, which may be due to the fact that the PAMAM generation 3.5 reagent anions have more carboxylate sites available to compete for the sodium ions.

Another observation associated with the experiment summarized in FIG. 7 is the improvement in signal-to-noise ratio for the analyte ion upon charge inversion. Although the absolute signal of the $[M-H]^-$ ion is lower in the negative ion spectrum than the combined signals of the analyte containing cations, there is much lower chemical noise in the charge inversion spectrum. This may be due to the fact that many of the ions that contribute to the positive ion spectrum are not efficiently inverted in charge upon reaction with the reagent anions. There is a degree of selectivity associated with the charge inversion process that may depend upon chemical characteristics of both the analyte cations and the reagent anions. In the analyte, for example, charge inversion may be most likely when the analyte bears functional groups that readily ionize in the polarity of the reagent anion. The tendency for charge inversion also may depend upon the charge state and nature of the charge bearing sites in the anion. Hence, a degree of "tuning" is possible is designing reagents for charge inversion experiments.

The GSH-adduct data shown here have involved sodium-containing S-valproic acid-GSH ions. A number of other GSH-adduct ions have also been examined and they have yielded quite similar results. Illustrative examples generated using the PAMAM generation 1.5 fragment anion $[PAMAM\text{-}X\text{-}Y\text{-}6H]^{6-}$ as the reagent are provided in FIGS. 8-11. These include ions derived from propyl-, p-nitrobenzyl-, and carprofen-adducts, as well as S-valproic acid-GSH cations with one or more excess potassium ions.

Other variations and modifications the methods and apparatus are possible. For example, while in the foregoing description, reference is made to a linear ion trap, it will be appreciated that ion traps other than linear ion traps may be used. Accordingly, aspects of the present invention may also be applied to ion traps other than linear ion traps. Further, mass spectrometers or ion guides other than quadrupole mass spectrometers can be used. For example, mass spectrometers having more than four rods may be used.

Although only a few examples of this invention have been described in detail above, those skilled in the art will readily appreciate that many modifications are possible without materially departing from the novel teachings and advantages of the invention. The invention is limited only by the claims and equivalents thereof.

What is claimed is:

1. A method of analyzing a sample, the method comprising:

providing a mass spectrometer;

generating positive ion types from an analyte, wherein at least one positive ion type of the positive ion types comprises a plurality of metal adducts;

generating multiply-deprotonated negative ion types from a reagent;

injecting positive ion types and the negative ion types in a sequence into a reaction chamber, without having isolated an ion type of the positive ion types so as to produce reaction products including a deprotonated analyte negative ion type, wherein the reagent is selected such that the step of injecting preferentially yields a deprotonated analyte negative ion type without a metal adduct and with a predetermined mass-to-charge ratio as a reaction product; and analyzing a mass spectrum of reaction products resulting from the step of injecting.

2. The method of claim 1, wherein the generation of positive ion types and negative ion types is by an electrospray ionization technique.

3. The method of claim 1, wherein the reagent is a polyamidomine (PAMAM) material.

4. The method of claim 1 wherein the reagent ions of the multiple deprotonated acidic sites.

5. The method of claim 1, wherein the mass spectrum is determined by mass-selective axial ejection (MSAE).

6. The method of claim 1 wherein the mass spectrometer comprises a plurality of linear ion traps (LIT).

7. The method of claim 1, wherein the analyte ions of the second polarity have substantially the same mass-to-charge ratio.

8. The method of claim 1, wherein the predetermined mass-to-charge ratio is achieved with a value of charge having a magnitude of unity.

9. The method of claim 1, wherein the reagent is selected such that reagent ions selectively bind with metal ions produced from the analyte.

10. The method of claim 1, wherein the reaction product of the analyte ions and the reagent ions is a charge inversion reaction product.

11. The method of claim 1, wherein the chamber is a linear ion trap (LIT).

12. The method of claim 1, where the chamber is a linear ion trap (LIT) of the mass spectrometer.

* * * * *